United States Patent
Wei et al.

(10) Patent No.: US 7,846,362 B2
(45) Date of Patent: Dec. 7, 2010

(54) HOUSING OF ELECTRONIC DEVICES AND METHOD

(75) Inventors: Dian-Hong Wei, Shenzhen (CN); Min Chen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 124 days.

(21) Appl. No.: 12/254,091

(22) Filed: Oct. 20, 2008

(65) Prior Publication Data

US 2009/0168313 A1 Jul. 2, 2009

(30) Foreign Application Priority Data

Dec. 29, 2007 (CN) .................. 2007 1 0203569

(51) Int. Cl.
*B29C 37/00* (2006.01)

(52) U.S. Cl. .................. 264/161; 264/163; 264/255; 264/279; 264/328.8; 361/679.01; 361/679.55

(58) Field of Classification Search ............ 361/679.01, 361/679.55, 679.56, 679.21; 455/575.1–575.4; 349/58–60; 264/328.8, 161, 163, 255, 279
See application file for complete search history.

(56) References Cited

U.S. PATENT DOCUMENTS

| | | | | |
|---|---|---|---|---|
| 2001/0038493 | A1* | 11/2001 | Watanabe et al. | 359/609 |
| 2003/0203219 | A1* | 10/2003 | Lin et al. | 428/457 |
| 2009/0092838 | A1* | 4/2009 | Wu | 428/412 |

FOREIGN PATENT DOCUMENTS

JP 57112965 A * 7/1992

* cited by examiner

*Primary Examiner*—Jayprakash N Gandhi
*Assistant Examiner*—Ingrid Wright
(74) *Attorney, Agent, or Firm*—Steven M. Reiss

(57) ABSTRACT

A method for making a housing, comprising steps of: providing an mold, the mold including a first female mold and a second female mold setting beside the first female mold, a male mold matingly engageable with the first female mold and the second female mold; the first female mold mating the male mold to form a first mold chamber; injecting molten material into the first mold chamber to form a main body on the male mold; setting a decorative film in the second female mold; rotating the male mold into contact with the second female mold to form a second mold chamber; injecting some transparent resin material into the second mold chamber to form a transparent plate.

3 Claims, 5 Drawing Sheets

HOUSING OF ELECTRONIC DEVICES AND METHOD

BACKGROUND OF THE INVENTION

1. Field of the Invention

The present invention generally relates to a housing and a method for making the housing, particularly to a housing of electronic devices and a method for making the housing.

2. Description of Related Art

A housing for electronic devices usually includes a main body and a transparent cover/face plate. A traditional method for making the housing is forming the main body and the transparent plate separate from each other. Then, the transparent plate is adhered to the main body to form the housing by a method of ultrasonic bonding or heated welding. However, the method of adhering the transparent plate to the main body cannot always achieve a desired level of airproof and dustproof performance. Thus, moisture and dust in the ambient air can enter into the electronic device and damage to the electronic device.

An injection molding process may produce a housing with the transparent plate integrally formed together, which can achieve a desired level of airproof and dustproof performance. A decorative layer is formed on the transparent plate by IMD (insert mold decoration) in a mold. However, the IMD process and the forming of the integrated transparent plate and main body are separate process. This will greatly reduce the production efficiency.

Therefore, there is room for improvement within the art.

BRIEF DESCRIPTION OF THE DRAWINGS

Many aspects of method for making a housing can be better understood with reference to the following drawing. The components in the drawing are not necessarily drawn to scale, the emphasis instead being placed upon clearly illustrating the principles of the method for making a housing. Moreover, in the drawing like reference numerals designate corresponding parts throughout the several views, in which.

DETAILED DESCRIPTION OF THE PREFERRED EMBODIMENTS

Figure 1:
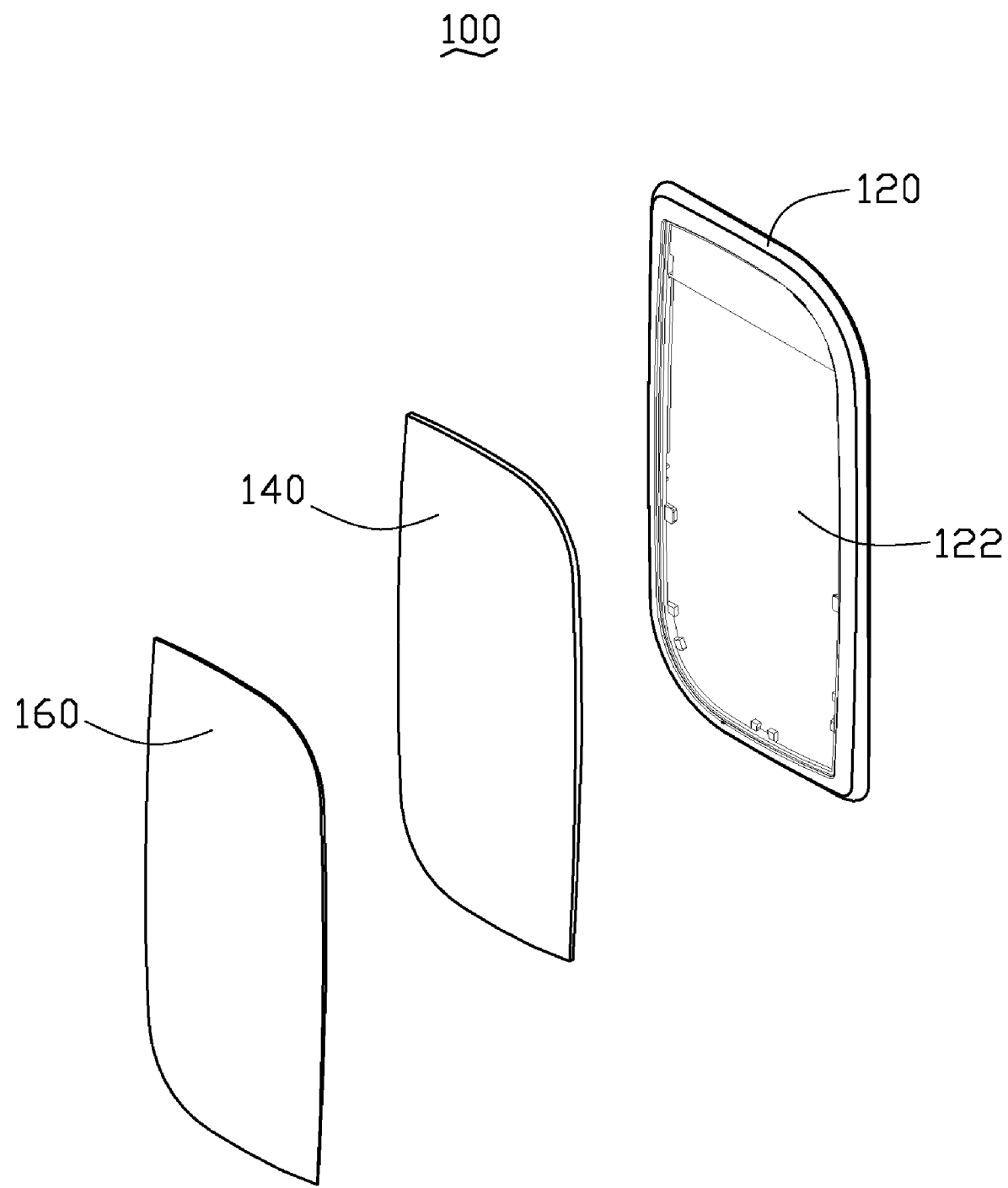
FIG. 1 is a schematic, exploded view of an exemplary embodiment of a housing for a electronic device.

Referring to FIG. 1, in a present embodiment, a housing 100 includes a main body 120, a transparent plate 140 and a decorative film 160.

The main body 120 is substantially rectangular and defines an opening 122. The main body 120 can be made of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof. The main body 120, according to an exemplary embodiment, is made of polyvinyl chloride and polyethylene terephthalate. The transparent plate 140 may be made of transparent moldable material, such as polymethylmethacrylate. The decorative film 160 is made of ink, and covers a surface of the main body 120 for giving the main body 120 a better more attractive appearance. The transparent plate 140 and the decorative film 160 are simultaneously molded to the main body 120 to form the housing.

Figure 2:
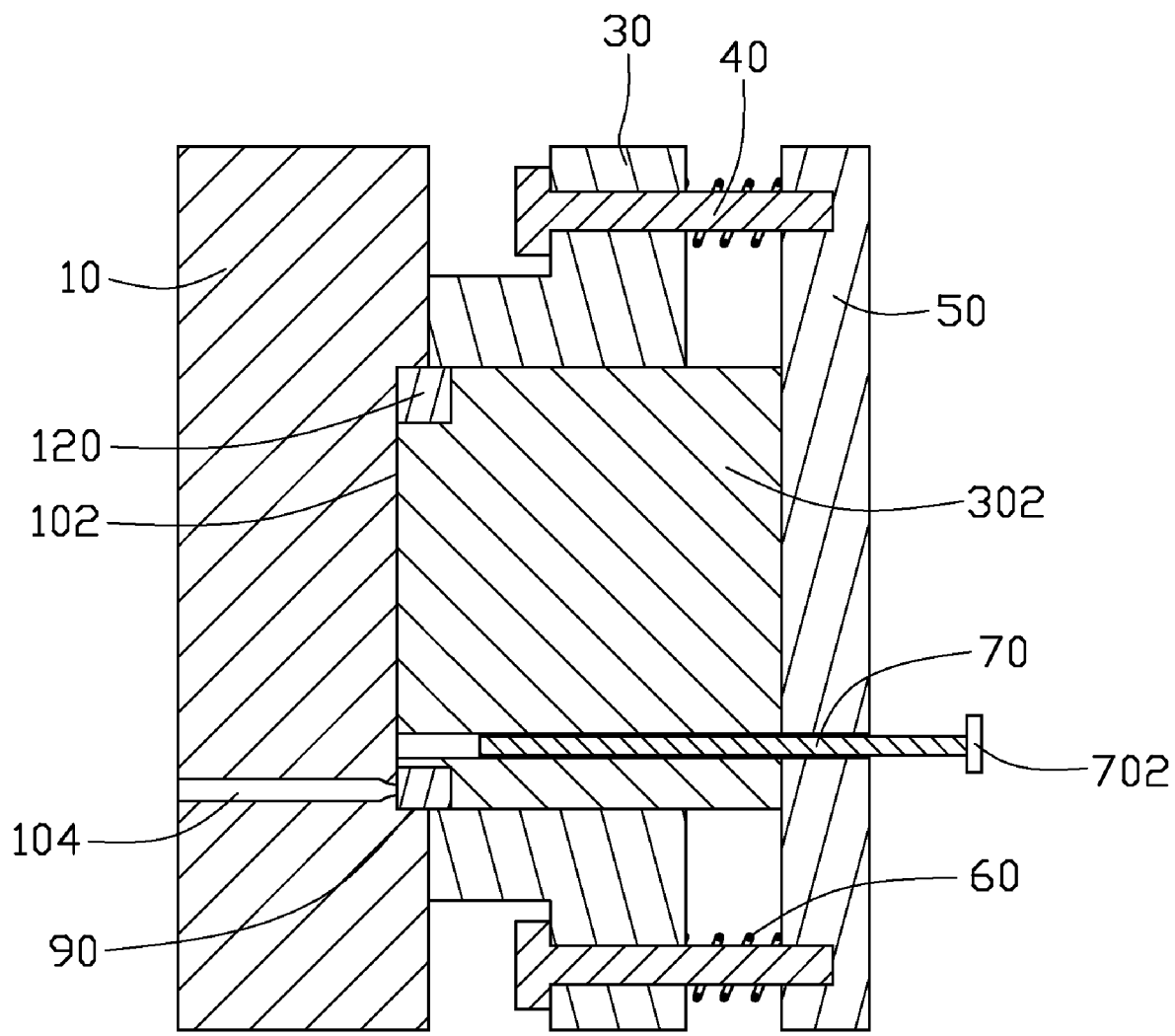
FIG. 2 is a cross-sectional view of an exemplary embodiment of a first female mold attached with a male mold.
Figure 3:
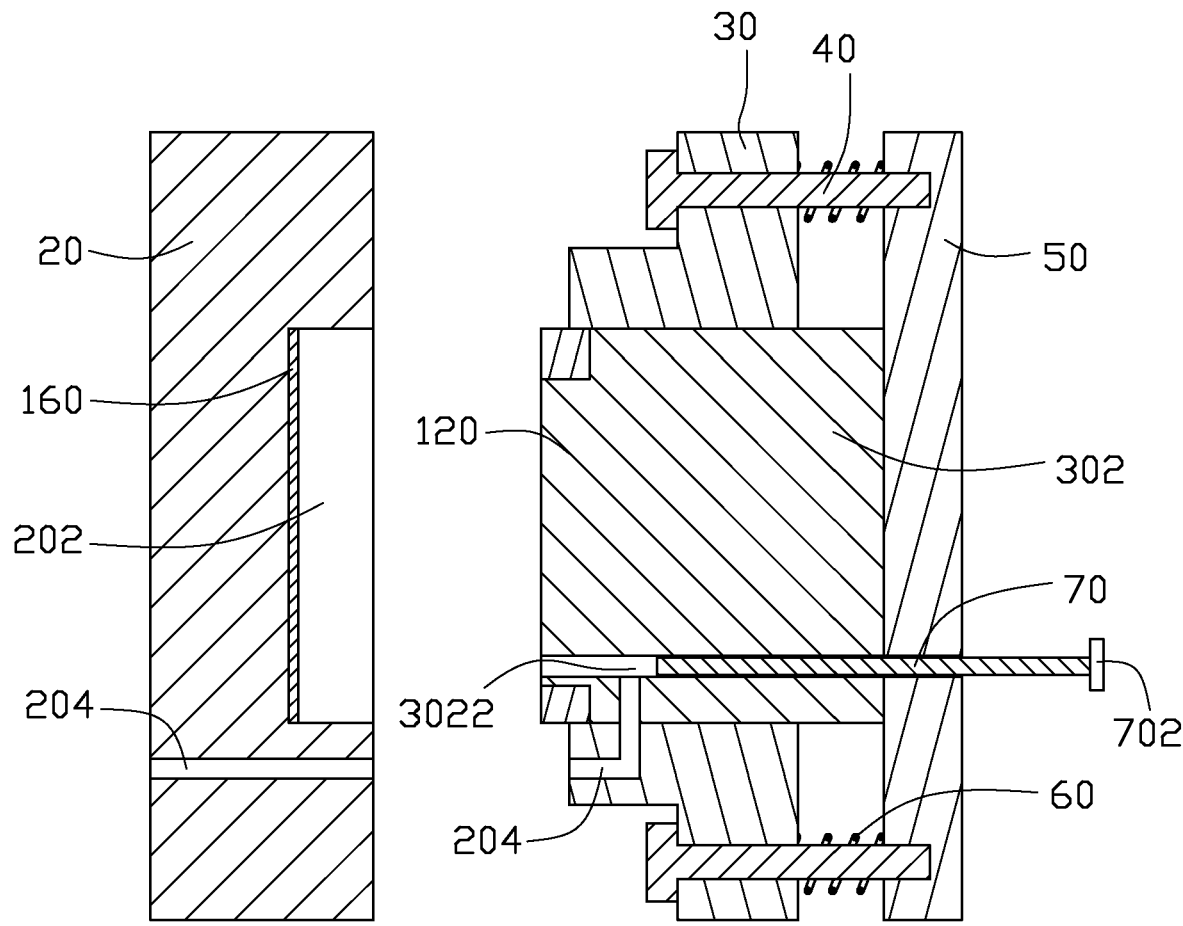
FIG. 3 is a cross-sectional view of an exemplary embodiment of a second female mold detached from the male mold.

An exemplary embodiment of a method for making the housing 100 comprises the steps of:

Referring to FIGS. 2 and 3, a double colored plastic injection machine is provided. The double colored plastic injection machine includes a mold. The mold includes a first female mold 10 and a second female mold 20 set beside the first female mold 10. A male mold 30 is set on a rotary table and can matingly engage with the first female mold 10 or the second female mold 20.

The first female mold 10 has a first recessed mold portion 102 and a first runner 104 communicating therewith. The second female mold 20 has a second recessed mold portion 202 and a second runner 204 communicating therewith.

The male mold 30 is slidably set on a moldboard 50 by a plurality of guide rods 40, and the male mold 30 can rotate with the moldboard 50 in a double colored plastic injection machine. A plurality of elastic components 60 are respectively fit over the guide rods 40 between the male mold 30 and the moldboard 50. Therefore, the male mold 30 keeps a fixed distance away from the moldboard 50 by the elastic components 60, when no force is exerted on the male mold 30. The male mold 30 has a mold core 302, and the mold core 302 is supported on the moldboard 50 corresponding to the first recessed mold portion 102. The mold core 302 can rotate 180 degrees with the male mold 30, so the mold core 302 is aligned with the second recessed mold portion 202. The male mold 30 can simultaneously slide on the guide rods 40 and the mold core 302. The mold core 302 has a through hole 3022 defined therein and an ejector pin 70 is set therein. The ejector pin 70 is fixed on a flange 702. The ejector pin 70 can move in the through hole 3022 when a force exerted on the flange 702. The male mold 30 and the mold core 302 have a second runner 204 respectively. The second runner 204 communicates with the through hole 3022, so molten material can run into the second recessed mold portion 202 by the through hole 3022.

Using the double colored plastic injection machine to form the housing 100 may include the steps of:

Firstly, to form the main body 120: the mold is closed by engaging the first female mold 10 with the male mold 30. The first recessed mold portion 102 mates the mold core 302 to form a first mold chamber 90. A material, such as acrylonitrile-butadiene-styrene and/or polycarbonate are injected into the first mold chamber 90 through the first runner 104. After cooled, the first female mold 10 is detached from the male mold 30. The main body 120 is formed on the mold core 302.

Figure 4:
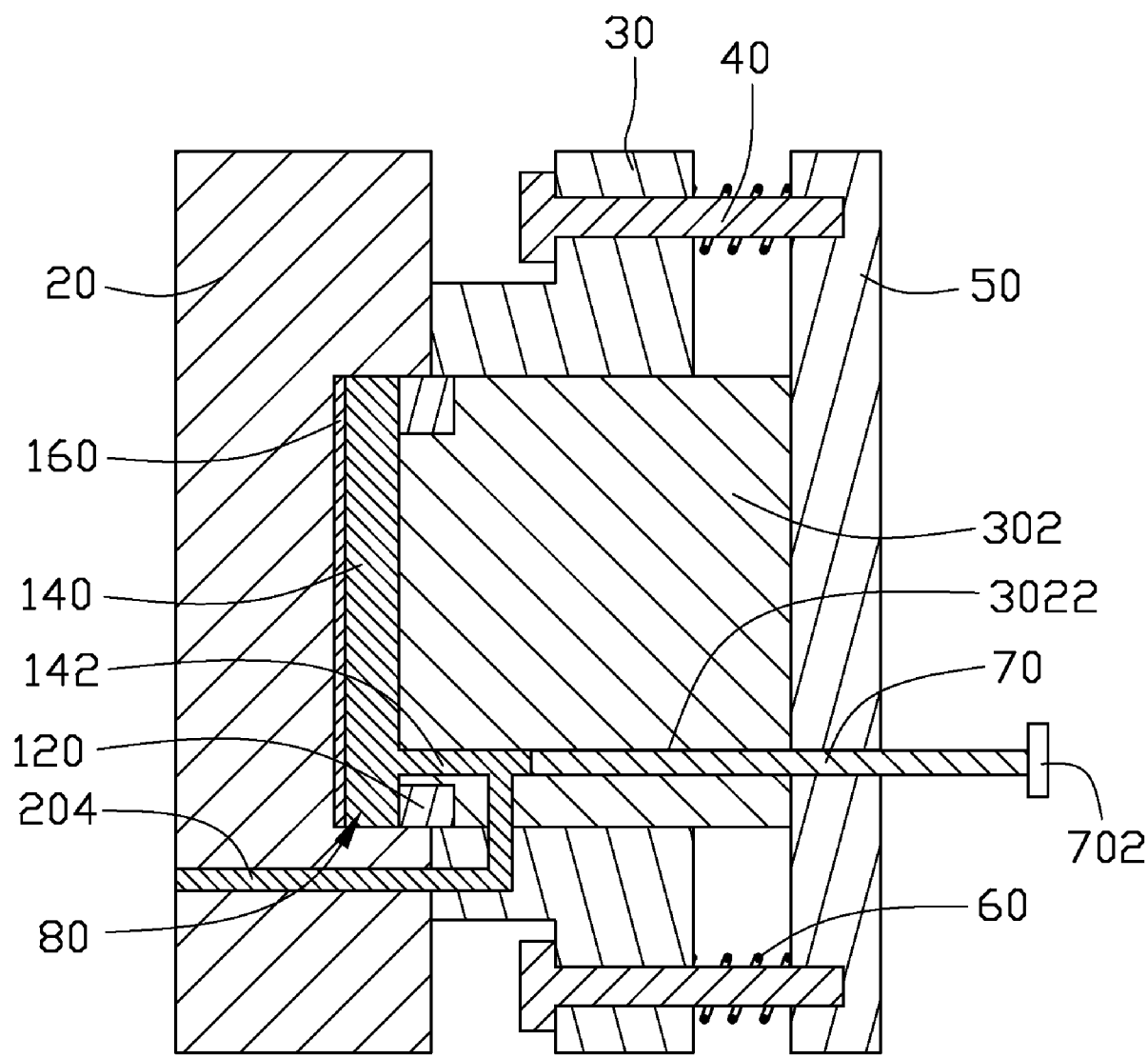
FIG. 4 is a schematic view of the second female mold attached to the male mold shown in FIG. 3 to inject therein.
Figure 5:
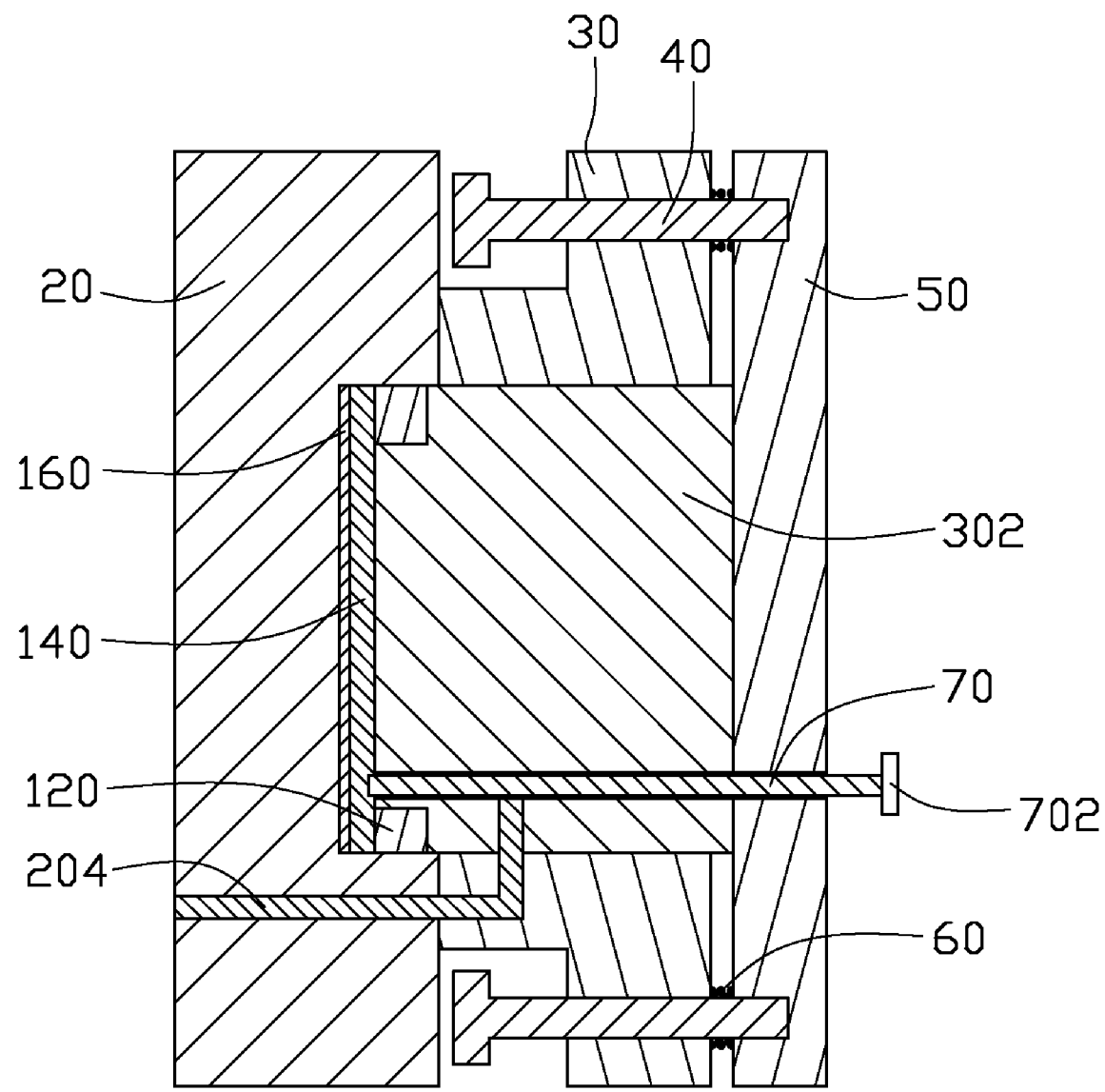
FIG. 5 is a schematic view of the second female mold moving towards the male mold and compressing a second mold chamber to cut a scrap.

Secondly, referring to FIGS. 4 and 5, forming the transparent plate 140 and IMD may include: the male mold 30 is rotated 180 degrees by the rotary table. The decorative film 160 is set in the second recessed mold portion 202 beforehand. The mold is closed by engaging the mold core 302 with the second female mold 20 to form a second mold chamber 80. Some transparent resin material is injected into the second mold chamber 80 through the through hole 3022 to form the transparent plate 140. The transparent resin material may be polymethylmethacrylate. The second mold chamber 80 is not completely filled with the transparent resin material. At the same time, the decorative film 160 is covered on a surface of the transparent plate 140.

Thirdly, cut a scrap 142 by IMC (insert mold cut) process. The process of IMC is: when the transparent plate 140 is formed, the scrap 142 is formed on a junction of the transparent plate 140 and the through hole 3022. A force is exerted on the flange 702 for driving the ejector pin 70 to extrude the scrap 142. So the scrap 142 is combined with the transparent plate 140 together. The process of IMC may remove the scrap 142 to omit step of subsequent cut the scrap 142. Therefore the IMC process may save lots of processing time.

Fourthly, the main body 120 and the transparent plate 140 are compressed. The compress process includes: the second female mold 20 is moved towards the male mold 30, the male mold 30 is moved towards the moldboard 50, compressing the elastic components 60. By compressing the male mold 30, the male mold 30 is also sliding on the mold core 302 for reducing a distance between the second female mold 20 and the mold core 302. So the second mold chamber 80 is fully filled to form the housing 100, configured for tight coupling and reducing the stress between the main body 120 and the transparent plate 140.

Fifthly, after cooling, the second female mold 20 and the male mold 30 are separated to remove the housing 100 from the mold.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making a housing, comprising steps of:
    providing a mold, the mold including a first female mold, a second female mold, a male mold, a mold core, and a moldboard; the male mold slidably fixed on the moldboard, the mold core supported on the moldboard and slidably received in the male mold, the male mold and the mold core rotated with the moldboard for being matingly engageable with either the first female mold or the second female mold;
    mating the first female mold with the mold core of the male mold to form a first mold chamber;
    injecting molten material into the first mold chamber to form a main body on the mold core;
    setting a decorative film in the second female mold;
    rotating the mold core of the male mold and mating the mold core with the main body and the second female mold to form a second mold chamber;
    injecting transparent resin material into the second mold chamber, the resin material filled between the main body and the decorative film;
    sliding the mold core and the moldboard relative to the male mold toward the second female mold to compress the transparent resin material in the second mold chamber;
    forming a transparent plate, the decorative film covering the transparent plate and combining with the main body to form a housing;
    cooling the mold and removing the housing.

2. The method for making a housing as claimed in claim 1, wherein the mold core defines a through hole, an ejector pin is slidably set in the through hole, the second female and the male mold have a second runner respectively.

3. The method for making a housing as claimed in claim 2, wherein a scrap is formed on a junction of the second mold chamber and the through hole, and a force is exerted on a flange of the ejector pin for driving the ejector pin to extrude the scrap into the second mold chamber and separate the scrap with the transparent resin material in the second runner, and the scrap is combined with the transparent plate together.

* * * * *